US009044024B2

United States Patent
Walz et al.

(10) Patent No.: US 9,044,024 B2
(45) Date of Patent: Jun. 2, 2015

(54) OVEN DOOR

(75) Inventors: Derek Allen Walz, Leo, IN (US); P. Andrew Tyler, Roanoke, IN (US); Douglas S. Jones, New Port Richey, FL (US); Steven Paul Everett, Jr., Oconomowoc, WI (US); Gorm Bressner, Providence, RI (US)

(73) Assignee: CLEVELAND RANGE, LLC, Wayne, IN (US)

( * ) Notice: Subject to any disclaimer, the term of this patent is extended or adjusted under 35 U.S.C. 154(b) by 690 days.

(21) Appl. No.: 13/350,190

(22) Filed: Jan. 13, 2012

(65) Prior Publication Data

US 2012/0234306 A1  Sep. 20, 2012

Related U.S. Application Data

(60) Provisional application No. 61/432,888, filed on Jan. 14, 2011.

(51) Int. Cl.
  *A21B 3/02* (2006.01)
  *A21B 1/48* (2006.01)

(52) U.S. Cl.
  CPC .... *A21B 1/48* (2013.01); *A21B 3/02* (2013.01)

(58) Field of Classification Search
  CPC .......... A21B 1/245; A21B 1/48; A21C 13/02; A47J 37/044; A47J 37/045
  USPC ............ 126/190, 192, 197, 198, 200; 49/130, 49/207, 209, 404, 424; 198/860.4; 99/386, 99/404, 420, 443 C, 443 R
  See application file for complete search history.

(56) References Cited

U.S. PATENT DOCUMENTS

| | | | | |
|---|---|---|---|---|
| 2,463,283 | A | * 3/1949 | Kaufman et al. | 62/443 |
| 2,883,227 | A | 9/1956 | Hoofe, III | |
| 3,059,087 | A | * 10/1962 | Perlman | 219/394 |
| 3,203,341 | A | * 8/1965 | Hedgepeth | 99/330 |
| 3,327,616 | A | 6/1967 | Ozymy | |
| 3,448,678 | A | * 6/1969 | Burstein | 99/386 |
| 3,769,749 | A | * 11/1973 | Makela | 49/130 |
| 4,189,631 | A | * 2/1980 | Baker et al. | 219/388 |
| 4,191,433 | A | * 3/1980 | Rampp et al. | 312/183 |
| 4,244,285 | A | * 1/1981 | Baker | 99/339 |
| 4,471,750 | A | 9/1984 | Burtea | |
| 4,503,837 | A | 3/1985 | Smith et al. | |
| 4,616,123 | A | 10/1986 | Zagoroff | |
| 4,757,642 | A | 7/1988 | Hahn | |

(Continued)

OTHER PUBLICATIONS

International Preliminary Report on Patentability dated Mar. 26, 2013 for PCT application No. PCT/US2012/021243.

(Continued)

*Primary Examiner* — Jorge Pereiro
(74) *Attorney, Agent, or Firm* — Ohlandt, Greeley, Ruggiero & Perle, L.L.P.

(57) ABSTRACT

There is provided an oven having an oven door assembly connected to a housing. The housing surrounds an oven interior and has an opening into the oven interior. The door assembly has an oven access door that covers the opening in the housing in a closed position. The oven access door moves in a first direction from a closed position to an open position uncovering the opening into the oven interior. The oven has a depth in the closed position. The oven access door moves in the first direction from the closed position to the open position within substantially the same depth of the oven in the closed position.

16 Claims, 6 Drawing Sheets

(56) References Cited

U.S. PATENT DOCUMENTS

| | | | | |
|---|---|---|---|---|
| 4,844,016 A | * | 7/1989 | Filosa | 119/481 |
| 4,928,624 A | * | 5/1990 | Overton, Jr. | 118/308 |
| 4,951,648 A | * | 8/1990 | Shukla et al. | 126/21 A |
| 4,960,100 A | | 10/1990 | Pellicane | |
| 5,277,105 A | * | 1/1994 | Bruno et al. | 99/443 C |
| 5,377,582 A | * | 1/1995 | Nersesian | 99/420 |
| 5,490,451 A | * | 2/1996 | Nersesian | 99/420 |
| 5,709,142 A | | 1/1998 | Nersesian | |
| 5,718,083 A | * | 2/1998 | Dowdell, II | 49/407 |
| 5,826,496 A | * | 10/1998 | Jara | 99/443 C |
| 5,832,812 A | * | 11/1998 | Wolfe et al. | 99/443 C |
| RE36,941 E | * | 11/2000 | Wolfe et al. | 99/443 C |
| 6,260,694 B1 | * | 7/2001 | Sasahara | 198/860.4 |
| 6,576,874 B2 | * | 6/2003 | Zapata et al. | 219/400 |
| 6,709,031 B1 | * | 3/2004 | Michael | 292/138 |
| 6,987,241 B2 | * | 1/2006 | Hacker et al. | 219/121.86 |
| 7,174,944 B1 | | 2/2007 | Clark et al. | |
| 7,624,728 B1 | | 12/2009 | Forbes | |
| 8,601,906 B2 | * | 12/2013 | Nishi et al. | 74/616 |
| 2004/0007885 A1 | * | 1/2004 | Michael | 292/336.3 |
| 2006/0027346 A1 | * | 2/2006 | Hsieh | 160/232 |
| 2009/0038228 A1 | | 2/2009 | Lee | |
| 2010/0199703 A1 | * | 8/2010 | Ziegler | 62/380 |

OTHER PUBLICATIONS

International Search Report and Written Opinion Mailed May 21, 2012 in the Corresponding PCT/US12/21243.

* cited by examiner

OVEN DOOR

CROSS-REFERENCE TO RELATED APPLICATIONS

This application claims the benefit of U.S. Provisional Application No. 61/432,888, filed Jan. 14, 2011. U.S. Provisional Application No. 61/432,888, filed Jan. 14, 2011 is hereby incorporated by reference in its entirety.

BACKGROUND

1. Field of the Invention

The present disclosure relates to oven doors. Particularly, the present disclosure relates to an oven door assembly that moves from a closed position to an open position while maintaining substantially the same depth of the oven.

2. Description of the Related Art

Current commercial conveyor ovens use various access door design methods to allow access to the oven for cleanability or access to the oven cavity. Some of those designs include a door that hinges downward, hinges open horizontally, or are removed completely via threaded knobs or latches. All of these current design methods are based on a hinging motion of a panel to gain access to the oven interior. These doors that include hinging motion of a panel have disadvantages when it comes to taking up valuable space within the kitchen environment. In the case of removing the door, it is also a disadvantage due to the excessive weight of these doors and the requirement for multiple people to lift the door.

The present disclosure overcomes these issues by providing access to the oven interior while the access panel stays within the overall depth footprint of the oven, while in the closed position or open positions. It allows for full access to the oven cavity thereby enabling more thorough cleaning and for easier configuration and change out of its associated components. This being done without removing the door or the door protruding into the aisle way of the kitchen.

SUMMARY

The present disclosure provides sliding-type doors that allow access to oven interiors. There is provided an oven having an oven door assembly connected to a housing. The housing surrounds an oven interior and has openings into the oven interior. The door assembly is an oven access door that covers one of the openings in the housing in a closed central position. The oven access door assembly moves in a first direction from the closed central position to an open position exposing a portion of the oven interior. The oven has a depth in the closed central position. The oven access door assembly moves in the first direction from the closed central position to the open position within substantially the same depth of the oven in the closed central position.

The above-described and other features and advantages of the present disclosure will be appreciated and understood by those skilled in the art from the following detailed description, drawings, and appended claims.

DESCRIPTION OF THE PREFERRED EMBODIMENT

Figure 1:
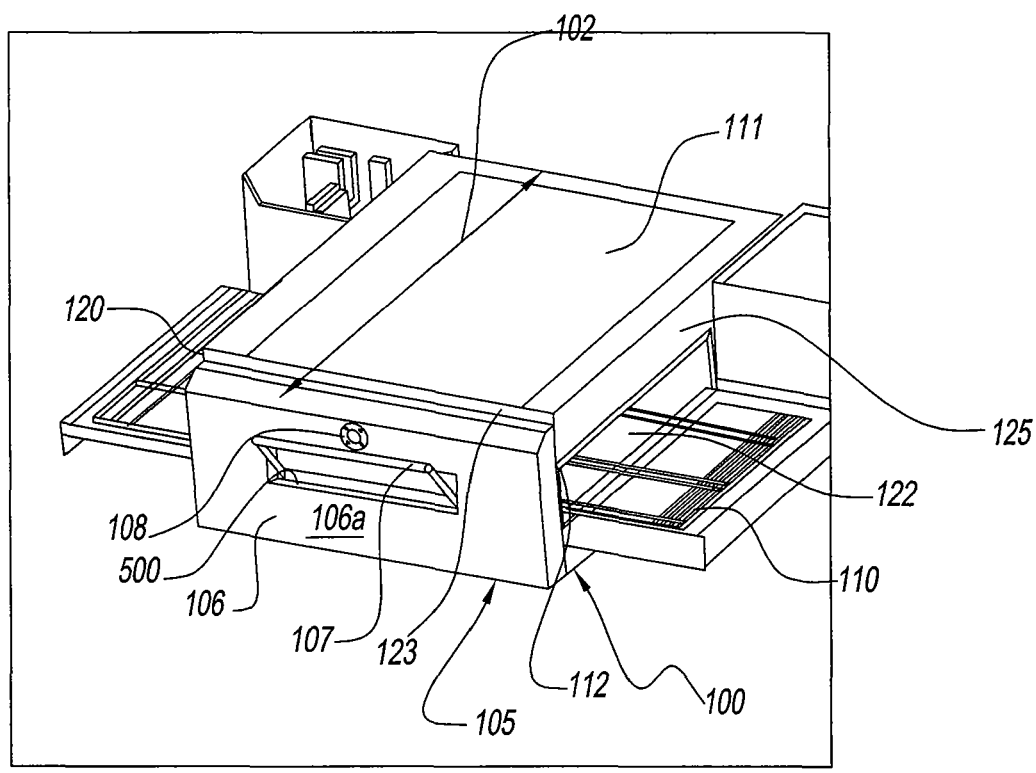
FIG. 1 is a top side perspective view of an exemplary embodiment of an oven having a door assembly of the present disclosure in a closed position.

FIG. 1 is an oven 100 having a door assembly 105 of the present disclosure in a closed position. Door assembly 105 has an oven access door 106. Oven access door 106 has an access window 500. Oven access door 106 has an exterior surface 106a that is connected to a handle 107 and a latch 108. Oven 100 has a closed depth 102 with door assembly 105 in the closed position.

The oven 100 is a conveyor oven having a conveyor 110 and a housing 111. Housing 111 encloses an oven interior 112 and has a first aperture 115 (FIG. 3) through a first side 120 of housing 111, housing opening 121 through a front side 123 of housing 111 (FIGS. 2 and 3), and a second aperture 122 through a second side 125 of housing 111. Each of first aperture 115, front opening 121, and second aperture 122 provide access to oven interior 112 through housing 111. Conveyor 110 has a continuous belt (not shown) that is rotated through first aperture 115, oven interior 112, and second aperture 122. Door assembly 105 is connected to housing 111 of oven 100 so that oven access door assembly 105 covers housing opening 121 in the closed position.

Oven 100 has a heating device (not shown) that heats oven interior 112. The heating device, for example, is an electric heating element configuration or gas burner configuration. An air impingement system may also be included in oven 100 that includes a partially enclosed volume in fluid communication with air in oven interior 112, at least one blower, a heating system in the enclosed volume, and a plurality of openings through the enclosed volume above and below conveyor 110. The blower(s) circulate an air flow re-circulating air within the oven interior 112 within the partially enclosed volume. The air in the partially enclosed volume is heated by the heating system. The air that has been heated is directed by the blower(s) from the partially enclosed volume through the plurality of openings directed toward conveyor 110 from above and below the conveyor. The heated air increases in velocity as the heated air is passed through the plurality of openings to impinge upon the conveyor 110 from above and below or any item thereon.

Figure 2:
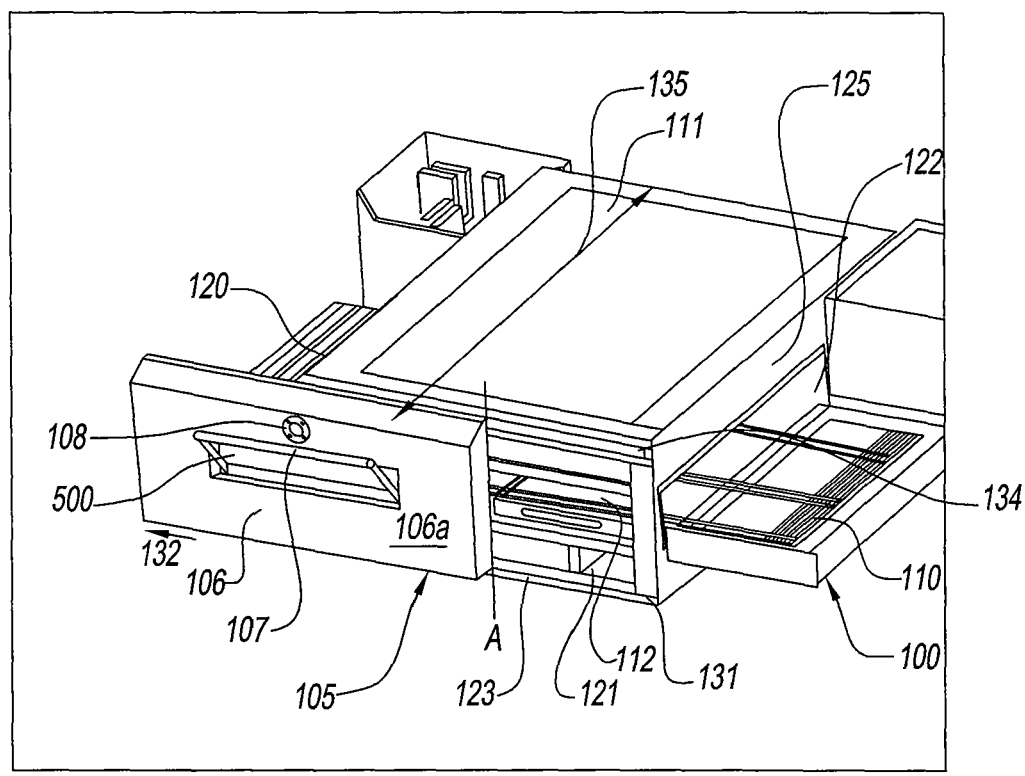
FIG. 2 is a top side perspective view of the oven of FIG. 1 having the door assembly in a first side open position.

FIG. 2 shows door assembly 105 in a first side open position. Oven access door 106 moves in a first direction 132 from the closed position shown in FIG. 1 to the first side open position shown in FIG. 2. First direction 132 is substantially perpendicular to a longitudinal axis A. Door assembly 105 provides access to oven interior 112 in the first side open position by moving oven access door 106 to uncover housing opening 121 on a first side of axis A. Oven access door 106 moves to the first side open position along a first track 131 and second track 134. Oven 100 has a first open depth 135 in the first side open position. First open depth 135 and closed depth 102 are substantially equal.

Figure 3:
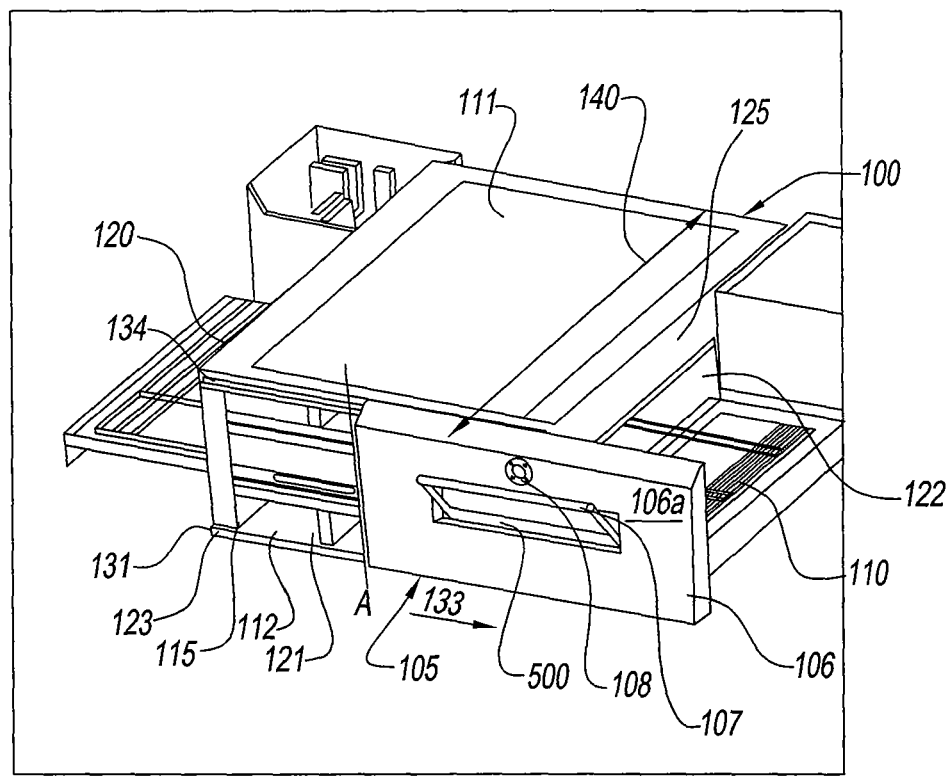
FIG. 3 is a top side perspective view of the oven of FIG. 1 having the door assembly in a second side open position.

FIG. 3 shows door assembly 105 in a second side open position. Oven access door 106 moves in a second direction 133 from the closed position shown in FIG. 1 to the second side open position shown in FIG. 3. Second direction 133 is substantially perpendicular to longitudinal axis A. Door assembly 105 provides access to oven interior 112 in the second side open position by moving oven access door 106 to uncover housing opening 121 on a second side of axis A opposite the first side of axis A. Oven access door 106 moves to the second side open position along first track 131 and second track 134. Oven 100 has a second open depth 140 in the second side open position. Second open depth 140 and closed depth 102 are substantially equal.

Figure 4:
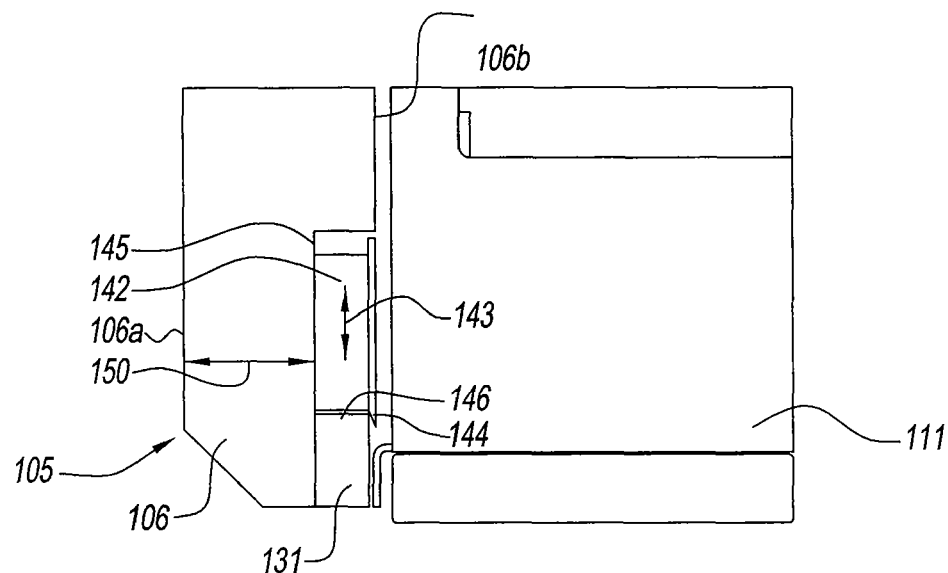
FIG. 4 is an enlarged partial cross-sectional view of a bottom side portion of the door assembly of FIG. 1.

FIG. 4 is an enlarged partial cross-sectional view of a bottom side portion of door assembly 105. Oven access door 106 has an interior surface 106b opposite exterior surface 106a. Interior surface 106b faces housing 111. Interior surface 106b is connected to a sliding mechanism. The sliding mechanism is a roller 142. Roller 142, for example, is metal. Roller 142 is rotatably connected to oven access door 106 so that it may rotate in clockwise and counterclockwise directions 143. Roller 142 has a protrusion 144 on a side opposite oven access door 106. Protrusion 144 is adjacent a first side of first track 131 and oven access door 106 is adjacent an opposite side of track so that roller 142 is supported and rotates along a track surface 146 to move oven access door 106 in first direction 132 and second direction 133. Interior surface 106b has a depression 145 so that oven access door 106 has a thickness 150 at depression 145 that is less than a thickness of a portion of oven access door 106 adjacent depression 145. Depression 145 is sized so that roller 142 does not extend beyond a thickness of a portion of oven access door 106 adjacent depression 145.

Figure 5:
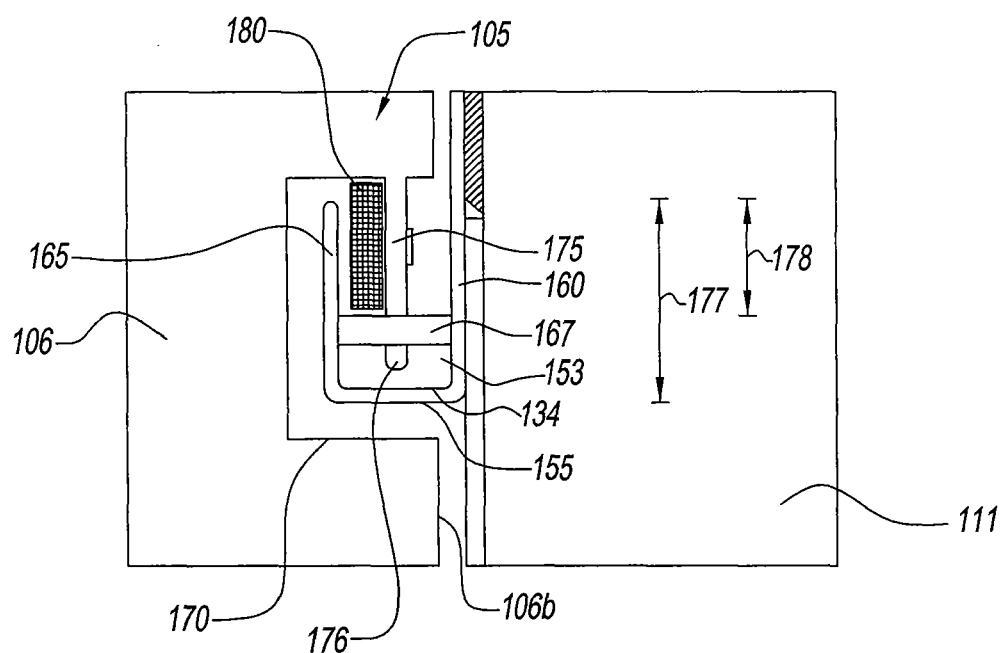
FIG. 5 is an enlarged partial cross-sectional view of a top end portion of the door assembly of FIG. 1.

FIG. 5 is an enlarged partial cross-sectional view of a top end portion of the door assembly 105 of FIG. 1. A preferred embodiment of track 134 is in a J-shape forming a cavity 153 between a bottom wall 155 and two side walls 160, 165. Side wall 160 is connected to housing 111. Oven access door 106 has a depression 170 and a projection 175 extending from a top portion of depression 170 into cavity 153. Projection 175 has a first protrusion 176 extends a first depth 177 into cavity 153. Projection 175 has a second depth 178 on each side of first protrusion 176.

Projection 175 is connected to a sealing material 180. Sealing material 180 is positioned between projection 175 and side wall 165 to form a seal between oven access door 106 and housing 111. Seal material 180 may also be positioned between oven access door 106 and housing 111 to surround the entire remaining perimeter of oven access door oven access door 106 to form a seal between oven access door oven access door 106 and housing 111. Sealing material 180 is, for example, stainless steel, polyamides known as nylon or polytetrafluoroethylene known as Teflon. Sealing material 180 is made from a high temperature plastic. Sealing material 180 is used strictly on the upper portion of door assembly 105. Sealing material 180 will not only seal air and heat from escaping between door assembly 105 and housing 111, but it will also act as a smooth sliding material. A second material is attached to the perimeter of door assembly 105 for sealing between door assembly 105 and housing 111. Sealing material 180 allows movement of projection 175 and oven access door 106.

Projection 175 moves in cavity 153 while oven access door 106 moves in first direction 132 and second direction 133. A first stop 167 and a second stop (not shown) extend into cavity 153. First stop 167 and second stop are positioned within first depth 177 of cavity 153 and below second depth 178. Projection 175 has first protrusion 176 that extends past first stop 167 and the second stop to allow for interference when oven door assembly 105 is in the first side open position and the second side open position.

Figure 6:
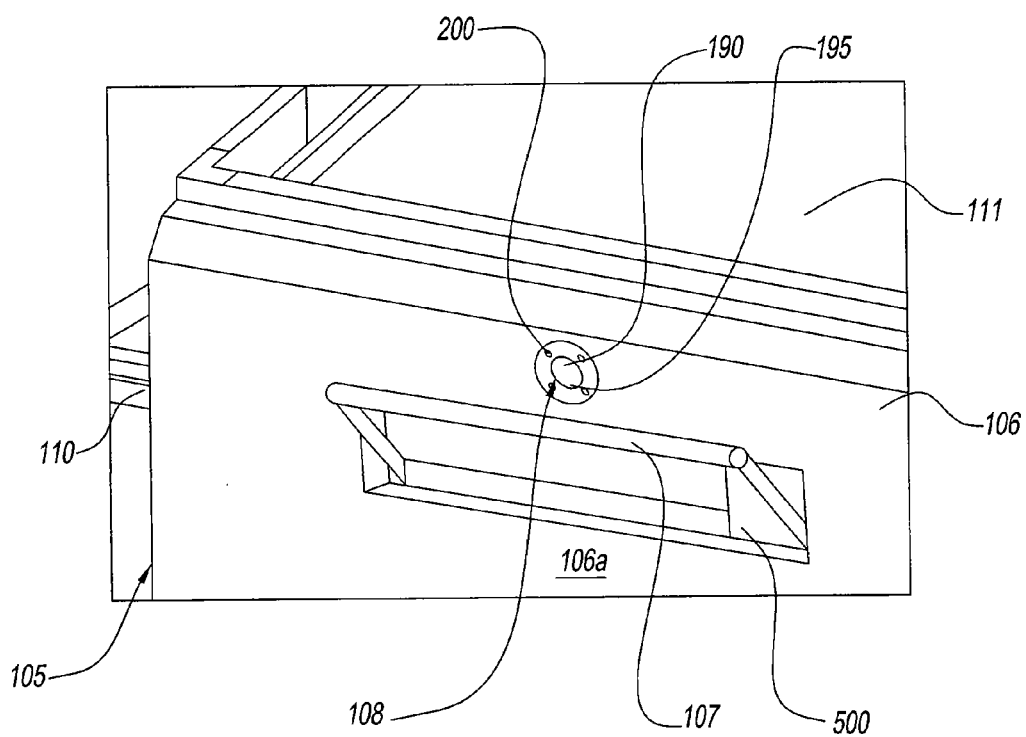
FIG. 6 is an enlarged partial top side perspective view of a top middle portion of the door assembly of FIG. 1.

FIG. 6 is an enlarged partial top side perspective view of a top middle portion of door assembly 105. One embodiment of latch 108 has a pushbutton 190. Pushbutton 190 has a contact portion 195 and a pushbutton housing 200. A bias mechanism (not shown) is between contact portion 195 and pushbutton housing 200 connected to oven access door 106. The bias mechanism biases contact portion 195 in a non-depressed position as shown in FIG. 6. Contact portion 195 may be pressed to depress contact portion 195 to a depressed position that moves contact portion 195 towards housing 111. The bias mechanism, for example, is a spring. Moving the contact portion 195 to the depressed position and then back to the non-depressed position alternately allows movement of oven access door 106 in an unlocked position of latch 108 and prohibits movement of oven access door 106 in a locked position of door assembly 105 maintaining oven access door 106 in the closed position. Latch 108 when engaged will insert a pin style mechanism into a hole.

Figure 7:
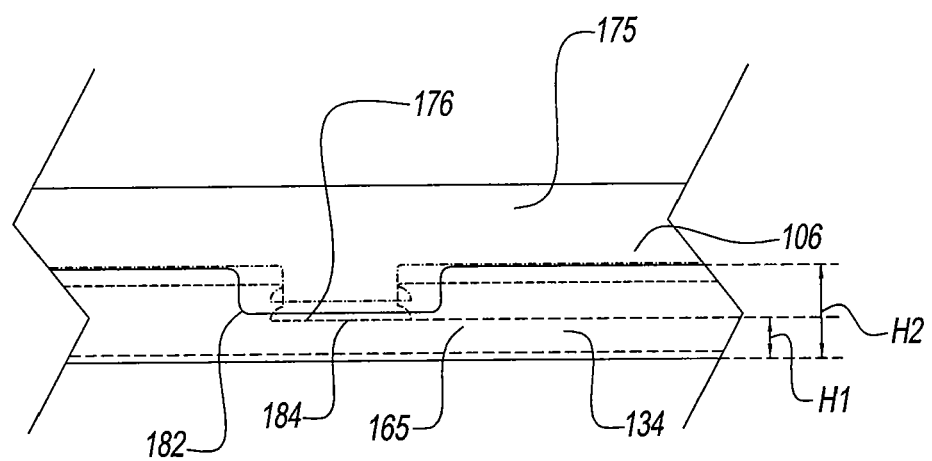
FIG. 7 is an enlarged partial front view of a track connected to a housing of the oven that receives a projection connected to an oven access door of the door assembly of FIG. 1, which is in the closed position, with a portion of the oven access door and the housing removed to expose the track and the projection.

FIG. 7 is an enlarged partial front view of second track 134 and projection 175 having first protrusion 176 extending therefrom with a portion of oven access door 106 and housing 111 removed to expose second track 134 and projection 175. Second track 134 has a notch 182 through side wall 165. Notch 182 that has a first height H1 with a remaining portion of side wall 165 having a second height H2. First height H1 is less than a height H2. First height H1 is sized so that a portion 184 of protrusion 176 extends below notch 182 and adjacent side wall 165. Notch 182 may be a cutout or a portion that is removed from the remainder of side wall 165. Notch 182 is located on side wall 165 so that protrusion 176 is aligned with notch 182 when door assembly 105 is in the closed position as shown in FIG. 7.

Notch 182 allows oven access door 106 to be removed from housing 111 when door assembly 105 is in the closed position. Oven access door 106 is disconnected from housing 111 by lifting oven access door 106 so that portion 184 of protrusion 176 is above notch 182 and projection 175 is above side wall 165, as shown by the dotted line 186 in FIG. 7, allowing protrusion 176 to pass through notch 182, and roller 142 is also moved so that protrusion 144 is lifted over first track 131 disconnecting roller 142 from first track 131. Oven access door 106 is connected to housing 111 by moving protrusion 176 through notch 182 and positioning roller 142 over first track 131, and allowing gravity to lower roller 142 on track 131 and position portion 184 of protrusion 176 below notch 182 and adjacent side wall 165. Tools are not required for connecting oven access door 106 to housing 111 or disconnecting oven access door 106 from housing 111 allowing for ease of operation. Oven access door 106 may be grasped on opposite sides for lifting and lowering oven access door 106 relative to housing 111. Gravity maintains oven access door 106 connected to housing 111 until oven access door 106 is lifted for disconnecting oven access door 106 from housing 111, which is only permissible when door assembly 105 is in the closed position due to the location of notch 182 allowing for safe operation.

During operation of oven 100, latch 108 is in the locked position maintaining oven access door 106 in the closed position covering housing opening 121. When oven is not being operated, a user can press contact portion 195 to move contact portion 195 to the depressed position and then allow the contact portion 195 to return back to the non-depressed position moving latch 108 from the locked position to the unlocked position allowing oven access door 106 to move in first direction 132 and second direction 133. Roller 142 is supported and rotates along track surface 146 to move oven access door 106 in first direction 132 from the closed position shown in FIG. 1 to the first side open position shown in FIG. 2. Protrusion 176 connected to projection 175 moves in cavity 153 while oven access door 106 moves in first direction 132. Protrusion 176 abuts first stop 167 prohibiting further movement of oven access door 106 in first direction 132 when oven door assembly 105 is in the first side open position.

Roller 142 is supported and rotates along track surface 146 to move oven access door 106 in second direction 133 from the closed position shown in FIG. 1 or the first side open position as shown in FIG. 2 to the second side open position shown in FIG. 3. Protrusion 176 connected to projection 175 moves in cavity 153 while oven access door 106 moves in second direction 133. Protrusion 176 abuts the second stop prohibiting further movement of oven access door 106 in second direction 133 when oven door assembly 105 is in the second side open position.

Roller 142 is supported and rotates along track surface 146 to move oven access door 106 in first direction 132 or second direction 133 from the first side open position as shown in FIG. 2 or the second side open position as shown in FIG. 3 to the closed position shown in FIG. 1. Projection 175 moves in cavity 153 while oven access door 106 moves in first direction 132 or second direction 133 to the closed position. The user can remove oven access door 106 or can press contact portion 195 to move contact portion 195 to the depressed position and then allow the contact portion 195 to return back to the non-depressed position moving latch 108 from the unlocked position to the locked position preventing oven access door 106 from moving in the first direction 132 and second direction 133. Sealing material 180 may be compressed in the locked position to form a seal between oven access door 106 and housing 111. Sealing material 180 may be slide against housing 111 when oven access door 106 moves.

During operation of oven 100, a user places a food item on conveyor 110. Conveyor 110 rotates to move the food item through first aperture 115 into oven interior 112 where the food item is heated by the heating device, for example, the heated air that is passed through the plurality of openings of the air impingement system above and below conveyor 110 in oven interior 112. The food item is moved out of oven interior 112 by conveyor 110 through second aperture 122 where the user removes the food item from conveyor 110. Heating the food items in oven interior 112 can result in particles being deposited in oven interior 112. In order to remove these particles, the user needs to access oven interior 112.

Moving oven access door 106 of door assembly 105 to the first side open position allows the user access to a first half of the oven. Moving oven access door 106 of door assembly 105 to the second side open position allows the user access to a second half of the oven. The user can clean the first half of the oven in the first side open position, and the second half of the oven in the second side open position. Finger or air ducts of the impingement air delivery system may be removed and oven interior 112 can be cleaned.

Door assembly 105 allows oven 100 to have closed depth 102 in the first side open position, the second side open position, and the closed position requiring less space than ovens that are hinged to the oven to open upward, downward or to one side. Door assembly 105 does not require one or more people to lift the door to access oven interior 112, however, door assembly 105 allows for removal of oven access door 106.

It should also be recognized that the terms "first", "second", "third", "upper", "lower", and the like may be used herein to modify various elements. These modifiers do not imply a spatial, sequential, or hierarchical order to the modified elements unless specifically stated.

While the present disclosure has been described with reference to one or more exemplary embodiments, it will be understood by those skilled in the art that various changes may be made and equivalents may be substituted for elements thereof without departing from the scope of the present disclosure. In addition, many modifications may be made to adapt a particular situation or material to the teachings of the disclosure without departing from the scope thereof. Therefore, it is intended that the present disclosure not be limited to the particular embodiment(s) disclosed as the best mode contemplated, but that the disclosure will include all embodiments falling within the scope of the appended claims.

What is claimed is:

1. An oven door assembly comprising:
an oven access door that connects to a housing of an oven, the housing surrounding an oven interior and having at least one housing opening, the oven access door covering the at least one housing opening in a closed central position, the oven access door assembly being moveable in a first direction by a first sliding motion from the closed central position to a first side open position exposing a first portion of the at least one housing opening on a first side of the oven access door, the oven access door assembly being moveable in a second direction by a second sliding motion from the closed central position to a second side open position exposing a second portion of the at least one housing opening on a second side of the oven access door opposite the first side, the oven having a depth in the closed central position, the oven access door moving in the first direction and the second direction within substantially the same depth of the oven in the closed central position, and the first portion of the at least one housing opening being only uncovered by the oven access door in the first side open position and the second portion of the at least one housing opening being only uncovered by the oven access door in the second side open position thereby providing full access to the entire oven interior.

2. The door assembly of claim 1, wherein the oven is a conveyor oven having a first aperture through a first side of the housing, the housing opening through a front side of the housing, a second aperture through a second side of the housing, and a continuous belt that is rotated through the first aperture, the oven interior, and the second aperture.

3. The door assembly of claim 2, wherein the oven has an air impingement system with a partially enclosed volume in fluid communication with air in the oven interior, at least one blower, a heating system in the partially enclosed volume, and a plurality of openings through the enclosed volume above and below the conveyor.

4. The door assembly of claim 1, wherein the oven access door moves along a first track and a second track.

5. The door assembly of claim 1, wherein the oven access door has an interior surface that faces the housing opposite an exterior surface, and wherein the interior surface is connected to a sliding mechanism.

6. The door assembly of claim 5, wherein the sliding mechanism is a roller rotatably connected to the oven access door so that the roller rotates in clockwise and counterclockwise directions, and wherein the roller is supported and rotates along a track surface to move the oven access door in the first direction.

7. The door assembly of claim 1, further comprising a track in a J-shape having a bottom wall between a first side wall and a second side wall forming a cavity therein, wherein the oven access door has a projection extending into the cavity between said first side wall and said second side wall.

8. The door assembly of claim 1, wherein the oven access door has a latch with a pushbutton, wherein the latch alternately allows movement of the oven access door in an unlocked position of the latch and prohibits movement of the oven access door in a locked position, wherein latch maintains the oven access door in the closed central position when the latch is in the locked position.

9. A method for accessing an oven interior surrounded by a housing of an oven, the method comprising:
   providing an oven access door that connects to the housing, the housing having at least one housing opening, the oven access door covering the at least one housing opening in a closed central position;
   moving the oven access door in a first direction from the closed central position to a first open position exposing a first portion of the at least one housing opening on a first side of the oven access door, the oven having a depth in the closed central position, the oven access door assembly moves in the first direction from the closed central position to the first open position within substantially the same depth of the oven in the closed central position; and
   moving the oven access door assembly in a second direction from the closed central position to a second side open position exposing a second portion of the at least one housing opening on a second side of the oven access door opposite the first side, and
   wherein the first portion of the at least one housing opening is only uncovered by the oven access door in the first side open position and the second portion of the at least one housing opening is only uncovered by the oven access door in the second side open position thereby providing full access to the entire oven interior.

10. The method of claim 9, further comprising a first stop prohibiting further movement of the oven access door in the first direction when the oven door assembly is in the first open position.

11. The method of claim 10, further comprising a second stop prohibiting further movement of the oven access door in the second direction when the oven door assembly is in the second side open position.

12. The method of claim 9, wherein the moving of the oven access door in the first direction comprises rotating a roller connected to the oven access door along track.

13. An oven door assembly comprising:
   an oven access door that connects to a housing of an oven, the housing surrounding an oven interior and having at least one housing opening, the oven access door covering the at least one housing opening in a closed central position, the oven access door assembly being moveable in a first direction by a sliding motion from the closed central position to an open position exposing a portion of the oven interior, the oven having a depth in the closed central position, the oven access door moving in the first direction from the closed central position to the open position within substantially the same depth of the oven in the closed central position; and
   a track in a J-shape having a bottom wall between a first side wall and a second side wall forming a cavity therein, wherein the oven access door has a projection extending into the cavity between said first side wall and said second side wall, wherein the projection has a first protrusion that extends a first depth into the cavity and the projection has a second depth on each side of the first protrusion that is smaller than the first depth.

14. The door assembly of claim 13, wherein the track has a notch through the second side wall so that the first protrusion is aligned with the notch in the closed central position, and wherein the oven access door is lifted so that the protrusion can pass through the notch to disconnect the oven access door from the housing of the oven.

15. The door assembly of claim 13, wherein the projection is connected to a sealing material positioned between the projection and one of the two side walls to form a seal between the oven access door and the housing, and wherein the sealing material allows movement of the projection and the oven access door.

16. The door assembly of claim 13, wherein the cavity has a first stop extending into the cavity of the track positioned within the first depth of the cavity and below the second depth, and wherein the projection has the protrusion that extends past the first stop to allow for interference when oven door assembly is in the first side open position.

* * * * *